United States Patent
Atkinson

(10) Patent No.: US 11,875,602 B2
(45) Date of Patent: Jan. 16, 2024

(54) DISPLAY DEVICE MODIFICATIONS

(71) Applicant: HEWLETT-PACKARD DEVELOPMENT COMPANY, L.P., Spring, TX (US)

(72) Inventor: Lee Atkinson, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 115 days.

(21) Appl. No.: 17/542,751

(22) Filed: Dec. 6, 2021

(65) Prior Publication Data

US 2023/0177874 A1    Jun. 8, 2023

(51) Int. Cl.
*G06V 10/60* (2022.01)
*G06V 40/16* (2022.01)
*G06V 10/141* (2022.01)
*G06V 10/56* (2022.01)

(52) U.S. Cl.
CPC .......... *G06V 40/171* (2022.01); *G06V 10/141* (2022.01); *G06V 10/56* (2022.01); *G06V 10/60* (2022.01); *G06V 40/162* (2022.01); *G06V 40/166* (2022.01)

(58) Field of Classification Search
CPC .... G06V 40/171; G06V 10/141; G06V 10/56; G06V 10/60; G06V 40/162; G06V 40/166
See application file for complete search history.

(56) References Cited

U.S. PATENT DOCUMENTS

| | | | |
|---|---|---|---|
| 8,483,479 B2 | 7/2013 | Kunkel | |
| 8,847,972 B2 | 9/2014 | Kane | |
| 9,530,342 B2 | 12/2016 | Bell | |
| 10,586,351 B1 | 3/2020 | Brailovskiy | |
| 2015/0145883 A1* | 5/2015 | Marti | G06T 11/001 345/592 |
| 2015/0264241 A1* | 9/2015 | Kleekajai | H04N 23/667 348/227.1 |
| 2019/0066340 A1 | 2/2019 | Lv | |
| 2019/0102608 A1* | 4/2019 | Wang | H04N 23/611 |
| 2022/0208142 A1* | 6/2022 | Yang | H04N 23/74 |

* cited by examiner

*Primary Examiner* — Syed Haider
(74) *Attorney, Agent, or Firm* — Knobbe, Martens, Olson & Bear, LLP

(57) ABSTRACT

An example non-transitory machine-readable storage medium includes instructions to, when executed by the processor, capture an image of a face of a user viewing a display device, identify a light source in the image, and identify light from the display device reflecting off the face of the user. The example instructions are also executable to determine a signature of the light in the image by 1) positively weighting a light measurement from the light source in the image and 2) negatively weighting a light measurement emanating from the display device and reflecting off the face of the user. The example instructions are also executable to modify a display device setting based on the signature of the light in the image.

19 Claims, 7 Drawing Sheets

DISPLAY DEVICE MODIFICATIONS

BACKGROUND

Computing devices include, or are coupled to, display devices that provide visual output. Settings of the display device dictate how the images displayed thereon are presented. Through a menu or other user interface, settings of the display device may be adjusted to alter how images are represented thereon.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
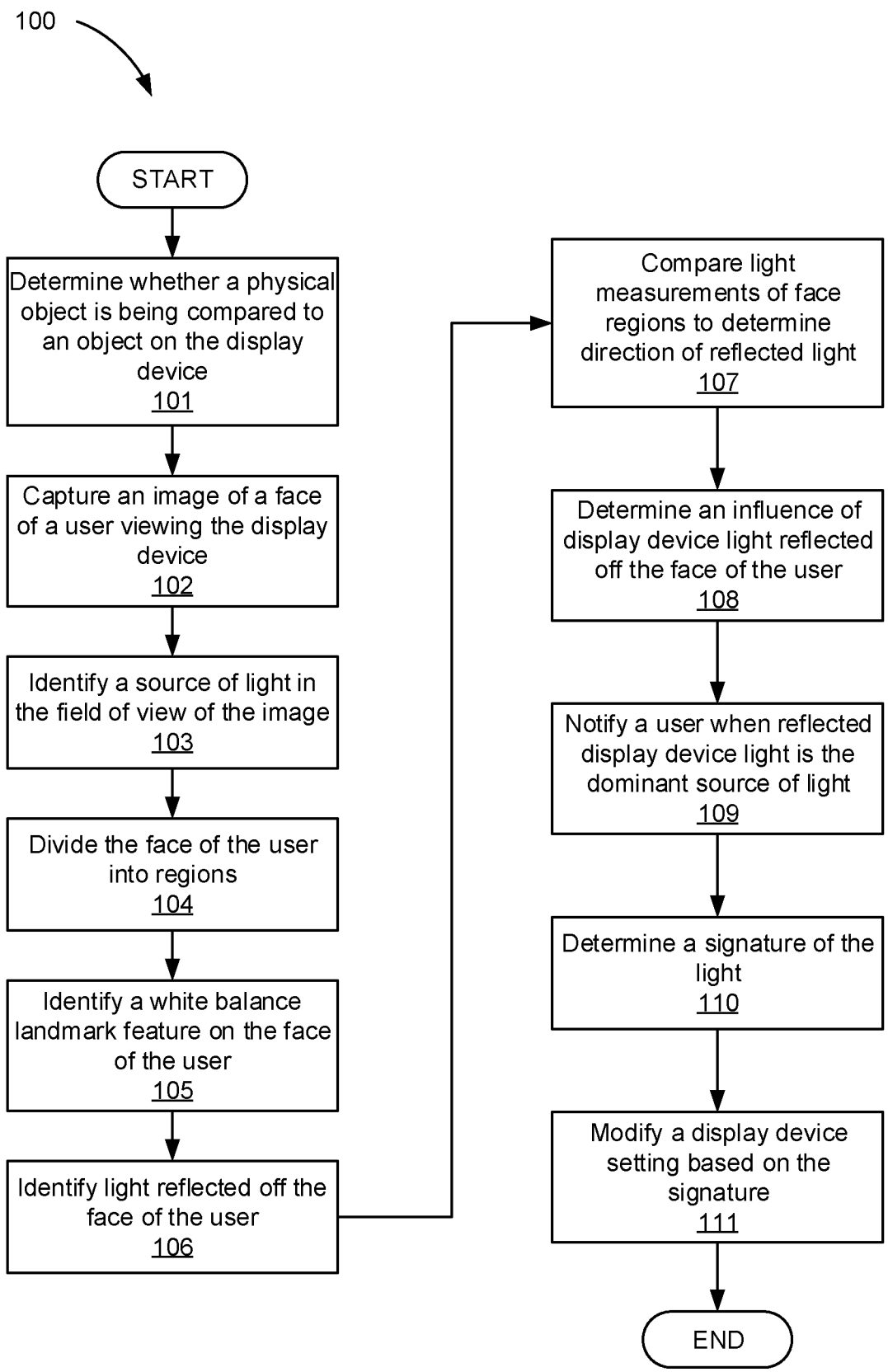
FIG. 1 is a flowchart of a method for modifying display device settings based on a light signature, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Display devices are electronic devices that can present visual information to a user. For example, a display device may present images and videos to a user looking at the display device. The display device has different hardware components that interoperate to present the images and videos. The settings of these hardware components may be adjusted, which alters how the display device displays the images and videos. For example, a display device brightness, contrast, and white point may be changed. In some applications, it may be particularly desirable to ensure that the settings of a computing device are precise.

As ambient light in the environment where the display device is found may alter how the display device presents objects, it may be desirable to account for the ambient light in determining the display device settings. That is, the luminance of ambient light may be used to control display device brightness and contrast as well as other display parameters. However, it may be that a light sensor to detect ambient light may inaccurately determine the signature of the ambient light. For example, some sensors include a monochromatic, single pixel light sensitive resistor or photocell. Based on sensor feedback, a controller may lower the backlighting when in a darker room, invert the display colors when in darkness, or strengthen contrast when in bright sunlight. Other adjustments are similarly available.

In another example, a sensor may include a multi-stimulus color sensor to detect the color of light. As a particular example, a sensor may sample the color spectrum of the incident light. The observed spectrum of the light may be used to affect the colors used on the display device itself, for example to set the white point of the display device.

In one particular example, adjustments may be made such that a person holding a physical object next to the display device may be able to compare the color of the physical object against the digital representation of the object on the display device. This may occur during online shopping or creative design. As a physical object is specularly reflective, the perceived light of the physical object is a product of the color quality of the available ambient light that is falling on the physical object and being reflected to the viewer. Accordingly, to ensure an accurate correct display, the computing device determines the actual ambient light that is reflecting from the physical object to the view of the user such that the display device settings may be adjusted to match.

However, some conditions may prevent the accurate detection of ambient light. For example, a sensor may be positioned adjacent the display device, for example along a bezel facing the user. The sensor may be diffuse and sample locations across the whole image or stream to determine the ambient light. Averaging light measurements across the entire field of view may mis-predict the actual lighting signature within the environment captured in the stream. For example, a light source directly in front of the user may be sensed by the sensor on the display device, but this light source in front of the user may be different than the light source that is illuminating the physical object. As a particular example, a user may be sitting in front of the display device. Light emanating from the display device may fall incident on the user. This reflective light from the display device may lead to a misprediction of the light that contributes to physical object color definition. That is, when the origin of light is not apparent, reflected light from a display device is less reliable than reflected light from the sides or behind the user in predicting or estimating the actual lighting conditions within the environment. Accordingly, a sensor which averages across the entire field of view, may include display-reflected light measurements in estimating ambient light. However, the display-reflected light is prone to result in mis-identification of actual lighting conditions. Put another way, an object or person directly in front of the display device may distort the estimation of ambient light as the color sensor may detect the color of the object or reflected light of the display device itself.

Accordingly, the present specification implements image identification to distinguish the actual ambient light sources from display device reflected light in an attempt to properly identify the light signature in the image or stream of images of the user and physical objects. Once properly identified, the display device settings may be adjusted so as to ensure proper color reproduction on the display device. Put another way, the present specification describes offsetting the ambient light estimation errors that result from light that emanates from the display device and is reflected off the user.

Specifically, the present specification describes relying on a user-facing camera to estimate the quality and relative direction of light sources in the environment of a computer user. Specifically, light associated with emissive light sources are positively weighted while reflected light from a display device is negatively weighted. The system also estimates a direction that the light is coming from. In some examples, the device estimates the type of light source. Examples of types of light sources include sunlight, incandescent light, light-emitting diode (LEDs), etc.

In some examples, the computing device recognizes when the user may be holding a physical object near the display device to compare the physical object with a digital object. The computing device may recognize which side of the display device the user is holding the physical object. This information may then be used to estimate the lighting affecting on the particular side of the display device where the user is holding the physical object.

As such, the present specification describes a capture device such as a multi-pixel or megapixel camera on the bezel that may detect objects within the image such as specific light sources such as lamps and windows. For light sources that are not in view of the capture device, the emanation direction of the out-of-image light source may be estimated by measuring overall ambience in the scene, the light gradient across the user face, and/or the relative luminance of the user compared to their background. In some examples, the display device itself may be identified as the dominant source of light.

Adjustments to the display device settings may then be made. In some examples, the capture device may also detect the motion of the user holding a physical object near the display device. The location of the physical object may be used such that the ambient light measurements are based on the exact physical location of the physical object.

The adjustments described herein may be performed without relying on a light and/or color sensor and may rely on a capture device. That is, the present specification decides what locations within the field of view of the capture device to sample to determine ambient light. Where other adjustment systems rely on a sampling across the entire field of view, the present specification excludes, or negatively weights certain regions that include light reflected from the display device. Based on this more precise estimate, more precise modifications may be made to the display device settings to ensure a more precise control and accurate color reproduction.

Specifically, the present specification describes a non-transitory machine-readable storage medium encoded with instructions executable by a processor of a computing device to, when executed by the processor, cause the processor to capture an image of a face of a user viewing a display device and identify a light source within the image. The instructions are also executable by the processor to identify light from the display device that is reflecting off the face of the user. The instructions are also executable by the processor to determine a signature of the light in the image by 1) positively weighting a light measurement from the light source and 2) negatively weighting a light measurement emanating from the display device and reflecting off the face of the user. The instructions are also executable by the processor to modify a display device setting based on the signature of the light in the image.

The present specification also describes a computing device. The computing device includes a capture device to capture an image of a face of a user viewing a display device. The computing device also includes a processor and non-transitory machine-readable instructions. When executing the instructions, the processor identifies a light source within a field of view of the image, identifies light reflecting off the face of the user, and identifies a direction of light reflecting off the face of the user. The processor also determines a signature of the light in the image by 1) positively weighting a light measurement from the source of light within the field of view, 2) positively weighting a light measurement behind or to the side of the user, and 3) negatively weighting a light measurement in front of the user. The processor also modifies a display device setting based on the signature of the light.

In another example, the non-transitory machine-readable storage medium includes instructions to cause the processor to capture an image of a face of a user viewing a display device and identify a light source within a field of view of the image. In this example, the instructions are also executable by the processor to divide the face of the user into regions and identify light reflecting off the face of the user. The instructions are executable by the processor to compare a light measurement from a first region to a light measurement in a second region to identify a direction of light reflecting off the face of the user. The instructions are also executable by the processor to determine a signature of the light in the image by 1) positively weighting a light measurement from the light source, 2) positively weighting a light measurement from a first zone of the image relative to the user, and 3) negatively weighting a light measurement from a second zone of the image relative to the user. The instructions are also executable by the processor to cause the processor to modify a display device setting based on the signature of the light.

As used in the present specification and in the appended claims, the term "signature" refers to any variety of characteristics of light in the environment where a computing device is located. For example, the signature may include a spectrum of the light in the image, a luminance of the light in the image, a red, green, and blue measurement of the light in the image, a wavelength of the light in the image, a frequency of the light in the image, an intensity of the light in the image, a white point of the light in the image or combinations thereof.

Turning now to the figures, FIG. 1 is a flowchart of a method 100 for modifying display device settings based on a light signature, according to an example. At step 101, the method 100 includes determining whether a physical object is being compared to an object displayed on the display device. That is, the detection of a light signature may be triggered by some event where an accurate color reproduction on the display device may be desired. For example, when comparing a physical object to a digital representation of the object on the display device, a user may desire for the display device to display the object with device settings that reflect or emulate the ambient light conditions. Accordingly, the processor may determine whether a physical object is being compared to an object displayed on the display device and may trigger determination of the signature of the light based on a determination that the physical object is being compared to the object displayed on the display device.

Such a determination may be made in any number of ways. In one example, the processor may perform object recognition to identify a movement of the physical object towards the display device. This may indicate the user is holding the physical object near the display device to compare the physical object against something displayed on the display device. Accordingly, the processor may trigger determination of the signature of the light based on a movement of the physical object relative to the display device.

As described above, the position of the physical object may trigger a localized signature determination. That is, light measurements may differ within the image or stream of images, even between a left and right side of the display device. Accordingly, the position of the physical object is detected, for example via object recognition, and the light measurements from the region of the image closest to the physical object may be positively weighted.

In another example, the processor may perform object recognition on the physical object and the object displayed on the display device. When the physical object shape is similar to a shape of an object displayed on the display device, ambient light estimation may be triggered.

In another example, the processor may perform color comparison between the physical object and the object displayed on the display device. For example, the processor may compare color qualities of the physical object adjacent or moving towards the display device with color qualities of a displayed object on the display device to trigger signature determination. That is, the processor may compare the color of the object with the presence of any pixels in the display image to identify if there is any likelihood of comparison. Accordingly, the computing device may include machine-readable storage medium with instructions to cause the processor to compare a color of the physical object with a color of the object displayed on the display device.

At step 102, the method 100 includes capturing an image of face of a user viewing the display device. That is, a computing device may include, or be coupled to, a capture device such as a camera or a video camera. The camera may be positioned so as to capture an image of the user's face as they are looking at the display device.

At step 103, the method 100 includes identifying a light source in the image. That is, there may be sources of light that are captured within the image. There may also be other light in the image that originates from a source that is outside the boundaries of the image. For example, it may be the case that a lamp, window, or other direct source of light is found within the field of view of the capture device. In this example, other light may be captured in the image, even though the source may not be in the image. For example, a ceiling light may not be captured in the image, but the light emanating from the ceiling light may illuminate the objects in the image. A light source that is captured in the image represents a credible and reliable component within the image on which the light signature may be determined.

The processor may identify a source of light within the field of view of the capture device in a variety of ways. For example, the processor may perform object recognition. On one example, the computing device may access a database of thousands of images that are tagged by characteristics such as shape, luminance, contrast with adjacent objects in the image. In this example, the processor may compare detected characteristics of an object in an image (i.e., its shape, luminance, and contrast with adjacent objects) and compare them against the corpus of images to identify the object as a light source.

In another example, object recognition may be based off an artificial intelligence network such as a neural network, deep neural network, or convoluted neural network, to identify the source of light based on its characteristics. As a particular example of identifying a light source based on an artificial intelligence network, a lamp or window may be identified by recognizing when brightly illuminated areas are defined by distinct geometric shapes. A sharpness mask based on luminance in the image may be used to detect straight lines and corners in the contrasting image. These straight lines and corners may indicate windows or lampshades while circles or ellipses may indicate a lamp. Convolutional network models look at multiple of these and other features and are trained against specific objects as well.

Examples of light sources that may be identified include lamps, light bulbs, and windows. However, other direct light sources may be similarly identified. As described above, the measurements, i.e., the intensity, luminance, wavelength, frequency, intensity etc., of these direct light sources may be positively weighted, or emphasized, in the determination of the signature of the light of the image.

At step 104, the method 100 includes dividing the face of the user 222 into regions. That is, the computing device may recognize landmarks on the user's face (including nose, eyes and cheeks). Because the face is not flat, a natural shadow is created along quadrants around the eyes and nose. Since human skin is a consistent reflectivity across the face, measuring illumination across the user's face can be used to estimate the relative location of an out-of-image light source, especially, whether the light source is above, directly in front, or to the left or right of the user.

At step 105, the method 100 includes identifying a white balance landmark feature on the face of the user. That is, one of the settings of the display device that may be adjusted is the white point, which is a value that defines the color white on the display device. Some features of the face such as the sclera of the eye and the user's teeth, or a white shirt on the user may be reliable features on which the white point setting of the display device may be set. Accordingly, the processor may execute instructions to identify a white balance landmark feature on the face of the user.

At step 106, the method 100 includes identifying light reflected off the face of the user. That is, as described above, it may be the case that other light sources illuminate objects within the scene, even though these other light sources are not visible within the image. Accordingly, the processor may identify light from the display device, or other sources, that reflect off the face of the user. That is, light sources that are outside of the field of view of the capture device, including light emanating from the display device, may reflect off the user and be reflected into the capture device. The processor may identify this reflected light. This may be performed by identifying pixel values to identify the surfaces of the image off which the light is reflecting. For example, certain pixels that may be white, near white, or off white may indicate reflected light.

Note that some of the light that is reflected off the viewer may contribute to the illumination of a physical object whereas some light that is reflected off the user does not illuminate the physical object. For example, light emanating from a display device may be reflected off the user and therefore does not represent the light incident on an object to define its color. This light from the display that is reflected off the user towards the capture device distorts the determination of the signature of the ambient light and is to be excluded or de-emphasized when determining the ambient light conditions within the image.

In an example, the reflection may be identified based on an artificial intelligence network. For example, a generative adversarial network (GAN) may be used to simulate the environment captured in the image. A GAN may model the image in the scene, change the parameters (such as the assumed light source position, the reflectivity of different objects in the scene, the color and luminance quality of different light sources in the scene), and test the result against the captured image. As such, even when the processor can detect light sources in an image, even arbitrary noise can be introduced.

At step 107, the method 100 includes comparing light measurements of regions of the face to determine a direction of reflected light. Specifically, the processor may compare a light measurement from a first region to a light measurement in a second region to identify a direction of light reflecting off the face of the user.

Based on such a comparison, the direction of the light may be determined, which aids in determining the overall signature of light. The determination of the direction of the light source enables for isolation of those light measurements that originate from the display device and are thus undesirable to be included as a basis for adjusting display device settings. For example, light that is to the side of and/or behind the user may be desirable as they are more reliable in determining the ambient light signature whereas light that is in front of the user may be undesirable as it is more likely to be light emanating from the display device and reflecting off the user and thus not contributing to lighting a particular object. Accordingly, once the direction of light is determined, the processor may determine the signature of the light in the image by 1) positively weighting a light measurement from a light source in the image; 2) positively weighting a light measurement from a first zone (a non-front zone) of the image relative to the user; and 3) negatively weighting a light measurement from a second zone (a front zone) of the image relative to the user.

At step 108, the method 100 includes determining an influence of display device light that is reflected off the face of the user. That is, it may be the case that a dominant light source in the image is from the light reflected off the display device. This may occur for example, when the room is dark and the light from the display device is the primary light source. Accordingly, the processor may execute instructions to determine when light from the display device reflected off the face of the user is a dominant light source in the image.

Doing so may be performed in a number of ways. In one example the influence of reflected display device light is determined based on the comparison of light measurements from different quadrants of the face of the user. For example, when the dominant light source is from the display device, the light will be strongest in the middle of the user's face with the light intensity tapering to the sides. Accordingly, a radial gradient from a center of the face may indicate that the display device reflected light is the dominant source of light in the image. By comparison, when light measurements across the face of the user are similar and have low contrast as compared to light measurements from a light source in the image, it may indicate that the dominant light source is behind the user (i.e., a lamp), rather than in front of the user (i.e., the display device).

In another example, the display device settings may be sequentially modulated to alter its output characteristics. These modulations can be associated with detected changes in the light signature to determine the effect of the modulations, and therefore the display device reflected light, on the overall lighting. Accordingly, the processor may determine an influence of light from the display device reflected off the face of the user by adjusting a display device setting and correlating a light measurement with the adjustment.

At step 109, the method 100 includes notifying a user when the reflected display device light is the dominant source of light. Such a notification is provided as ambient light estimation may be disrupted when the display device light is the dominant light source.

At step 110, the method 100 includes determining a signature of the light. This may be done by positively weighting a light measurement from a light source and negatively weighting a light measurement for light emanating from the display device and reflected off the face of the user. That is, the processor considers the different light sources in an environment, whether captured or not, and considers each source's contribution to the overall lighting in the environment.

As with the identification of the source and reflection, such signature determination may be based on an artificial intelligence network. In this example, the processor may collect data regarding light measurements from across the image and compare them to a database of images. Based on characteristics of both the target image and those in the neural network, the processor may determine the contribution of off-screen emissive light sources and specularly reflective light sources such as the display device and ensure that any sampling of ambient light within the scene does not include light, or negatively weights light, from the display device that is reflected off the user. In so doing, rather than having an ambient light estimation that is distorted by the presence of specularly reflective light, an accurate representation of ambient light is generated by including just those light sources that are emissive and reflective and that contribute to the identified color of a physical object.

In the example, where the position of the physical object is tracked, the processor may positively weight a light measurement that is adjacent the position of the physical object and positively weight a light measurement from a white balance landmark feature.

In some examples, the signature that is determined indicates a type of the light source. For example, instead of using the direct readings of the RGB tristimulus measurements, the relative strengths of these can be interpreted to represent certain types of artificial light or natural light. As another example, instead of using the measure white point, the detected RGB data from the image can be compared against data in a look-up table to identify an entry in the look up table that most closely matches the detected RGB data. Examples of light types include natural light (which may be classified by time of day, weather, time of year, etc.), halogen, incandescent, fluorescent, cool LED, and warm LED to name a few. Accordingly, the processor may compare a light measurement from the image to a database of light measurements of identified light types.

At step 111, the method 100 includes modifying a display device setting based on the signature. That is, the display device, lighting elements, and other hardware components may be adjusted such that the presentation of content thereon is also adjusted. Examples of settings that may be adjusted include, but are not limited to a brightness of the display device, a contrast of the display device, a white point of the display device, or combinations thereof.

In one particular example, the display device settings are adjusted to match the ambient light conditions. Specifically, the white point of the display may be matched with the white point of the ambient light. Such matching of the white point may include changing the RGB and color balance of the display device to match the spectrum strengths of ambient light and/or matching the overall luminance or contrast of the displayed image so that the display image matches the perception of the comparative physical object.

As such, the computing device may adjust the settings such that the presentation parameters for the display device more closely match the ambient light in the environment that is incident on a physical object that is being compared to a digital representation on the display device. As such, any digital representation of a physical object will more closely resemble the physical object it represents.

Moreover, accurate color representation may be useful in creative design. For example, were the display device settings incorrect, a sign generated on the computing device may appear different when printed based in part on the discrepancy between the display characteristics of the display device and the ambient light. An incorrect calibration of the display device based on an inaccurate estimate of ambient light may be no more helpful as it too may result in a printed product with an identified color discrepancy from what was intended and thought to have been produced. Accordingly, the present specification by ensuring accurate and more precise ambient light estimation, promotes a more accurate match between the digital representation and actual environmental conditions.

Figure 2:
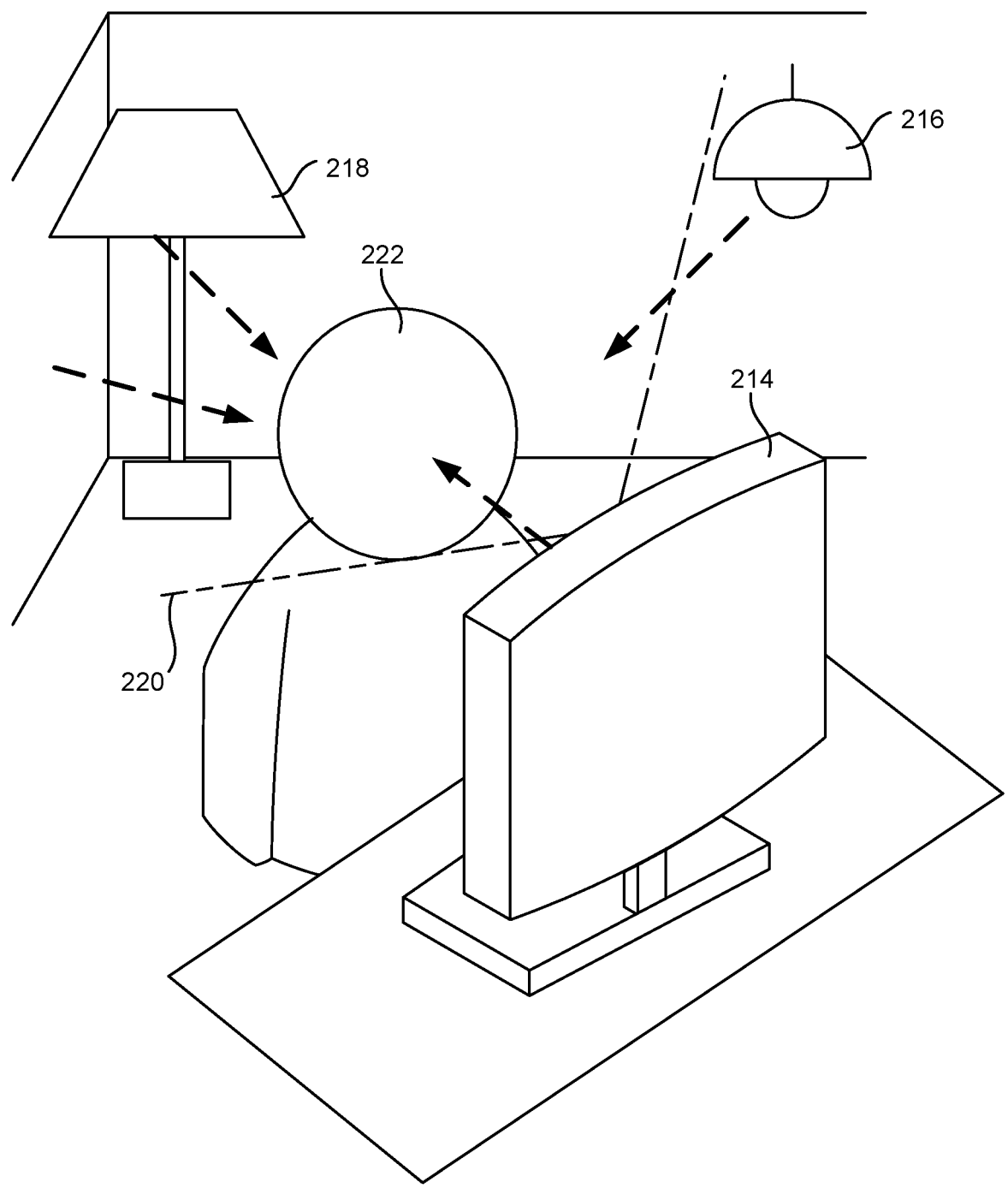
FIG. 2 depicts an environment where display device settings are adjusted based on a light signature, according to an example.

FIG. 2 depicts an environment where display device 214 settings are adjusted based on a light signature, according to an example. That is, as described above, a variety of light sources may contribute to the signature of the light that illuminates an environment. Specifically, FIG. 2 depicts a lamp 218 which may be within the field of view of the capture device and may therefore be captured in an image or stream of images. The field of view of the capture device is indicated by the dashed dot line 220 in FIG. 2. A ceiling light 216 may also contribute to the light signature of the illuminating light even though it is outside of the field of view of the capture device. Also, the light from the display device 214 may reflect off the face of the user 222. Still further, the light from any of these sources may reflect off the walls of the room. In FIG. 2 a simplified representation of the illumination of the light is indicated with dashed arrows.

As described above, some of the light that illuminates the user 222 may be undesirable for sampling to determine the light signature. For example, the light reflecting from the display device 214 may color or distort the ambient light signature determination. Accordingly, the processor may determine the light signature by excluding, or de-emphasizing, the light reflected off the face of the user 222 from the display device 214 while emphasizing the light from the lamp 218 and the ceiling light 216.

Accordingly, as described above, the processor of the computing device may identify those objects which are in the field of view of the capture device that are likely to be light sources and weights their light measurements positively to emphasize the reliability in their measurements as actual contributors to the ambient light in the room. As such, lamps 218 and windows and other light sources that are visible in the image may be identified via object recognition based on their brightness, shape, characteristic of the white point, luminance, and contrast relative to other components. Accordingly, as depicted in FIG. 2, the lamp 218 may be identified as a direct light source and this area in a captured image is positively weighted in determining the light signature within the scene.

When the light source is within the field of view of the capture device, the direction of the dominant light can be determined. However, in many cases, the actual light source (lamp, window) is not directly visible to the camera. For example, while out of the field of view of the capture device and therefore out of image, the light emanating from the ceiling light 216 still contributes to the light signature and may still be accounted for. That is, the light emitted from an off-scene light source may be positively weighted in determining the light signature. Determining the direction of the off-scene light may be performed in a variety of ways. For example, a luminance drop across the face of the user from left to right may suggest a side lighting whereas a luminance gradient vertically may indicate a vertical position of the light.

Knowing the direction of light may affect the determination of the signature. For example, the lighting may be different on either side of a display device 214. For example, as depicted in FIG. 2, the light signature on the side of the display device 214 nearest the ceiling light 216 may have a greater intensity than the lighting signature on the side of the display device 214 farther away from the ceiling light 216. Accordingly, in some examples, the display device 214 settings may be adjusted based on which side of the display device 214 the physical object to be compared is positioned.

As described above, not all of the light in the field of the view of the capture device is to be considered when determining the light signature. For example, an object or person directly in front of the display device 214 may distort the estimation of the ambient light signature as the capture device may detect the color of the object or user 222 or the reflected light from the display device 214 itself. Accordingly, in this example, the identify reflection instructions 536 may identify a user 222 via object recognition and analyze the light gradients across the user 222 to determine reflective light from an off-camera source that contributes to ambient light, i.e., the ceiling light 216, and isolate it from reflected light from the display device 214 which is to be excluded or negatively weighted. As such, an accurate indication of the ambient light conditions may be determined, without being distorted by reflective display device 214 light, such that an adjustment made to the display device 214 settings more accurately reproduces the lighting conditions of the ambient environment.

Figure 3:
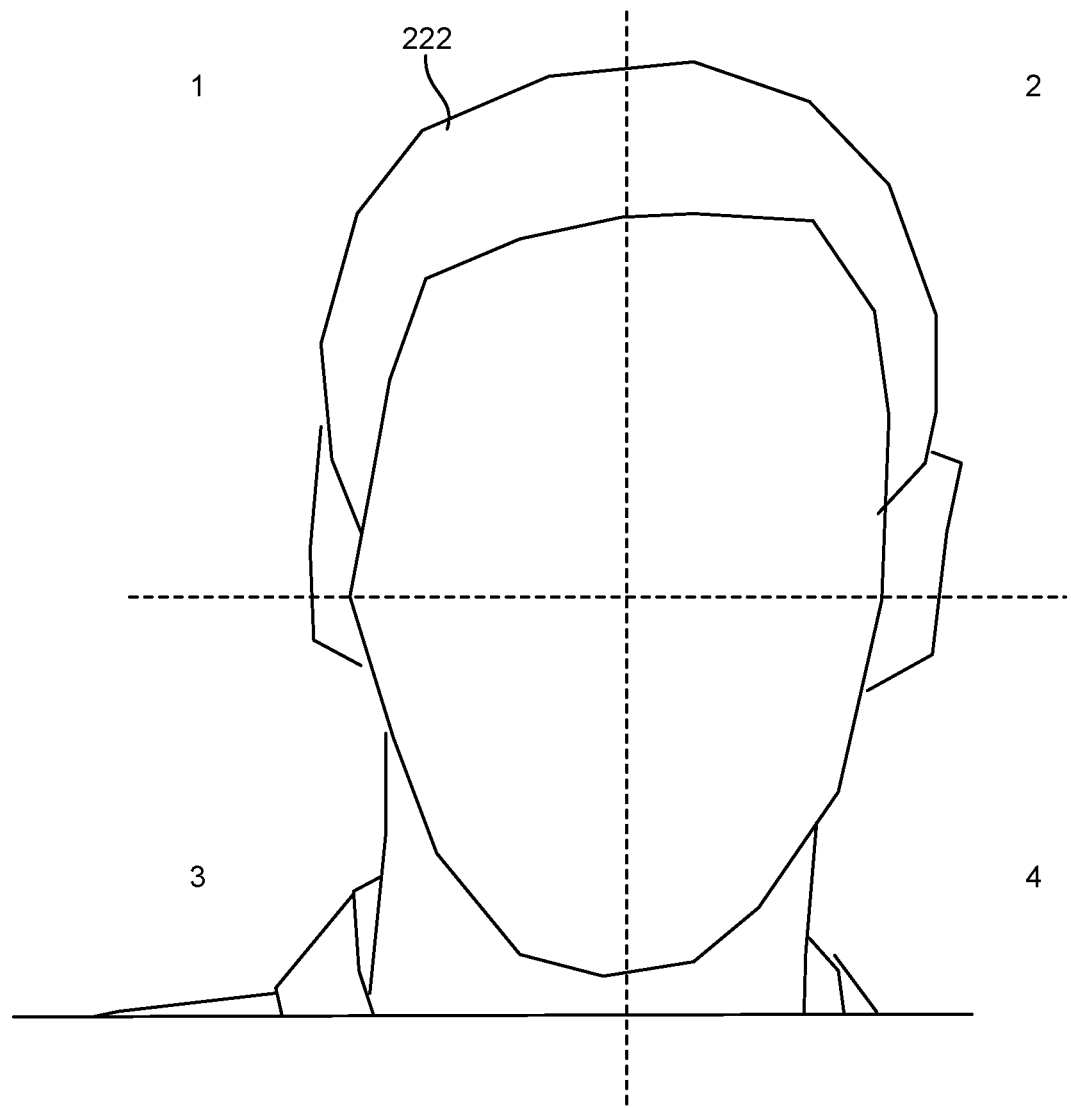
FIG. 3 depicts face division to identify a direction of light, according to an example.

FIG. 3 depicts face division to identify a direction of light, according to an example. As described above, the direction of the light may be determined by dividing a face of a user 222 into regions, such as quadrants and comparing light measurements from each quadrant against one another to determine the direction of light. In the example depicted in FIG. 3, the face is divided into quadrants. Luminance differences on the horizontal plane, (i.e., between quadrants 1 and 2 and between quadrants 3 and 4) indicate light source placement to left or right while luminance differences in the vertical plane (i.e., between quadrants 1 and 3 and between quadrants 2 and 4) indicate light source placement above or below the user 222. Based on the compared light measurements, the processor is to label the direction of light as below, above, to the left, to the right or a combination thereof to identify a direction of light reflecting off the face of the user 222.

Figure 4:
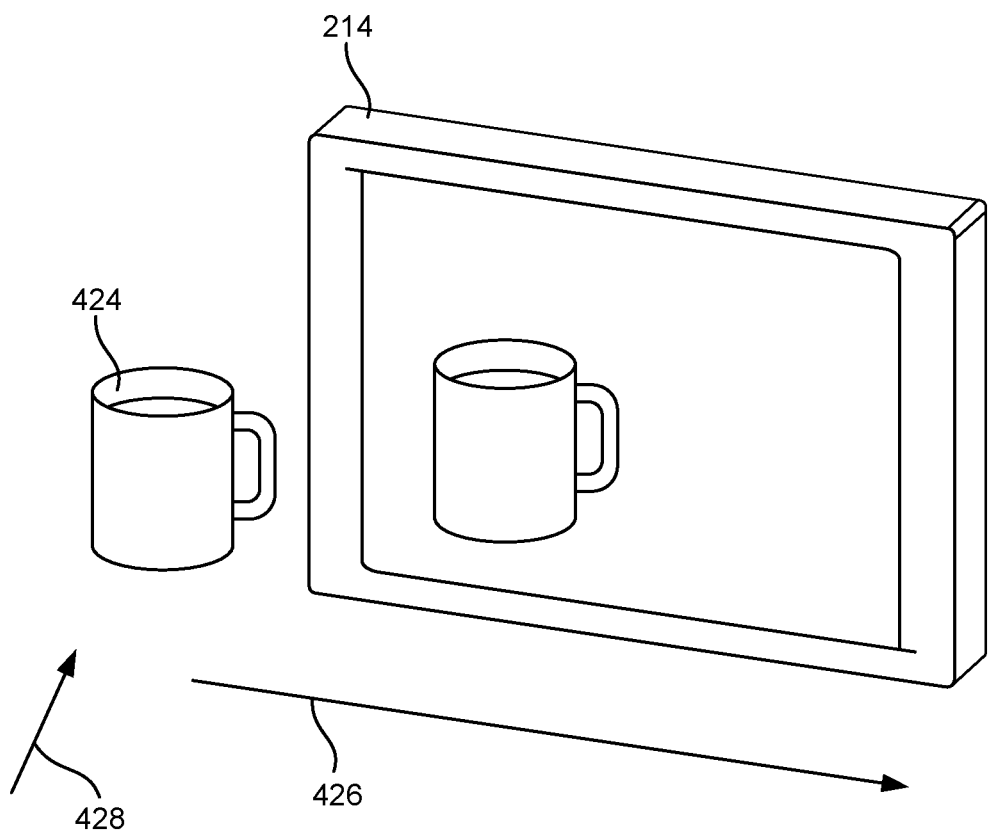
FIG. 4 depicts the movement of a physical object to trigger display device modifications, according to an example.

FIG. 4 depicts the movement of a physical object 424 to trigger display device 214 modifications, according to an example. As described above, the position and movement of the physical object 424 relative to the display device 214 may trigger the light signature determination and/or determine a localized region where light signature determination is to occur. For example, movement of the physical object 424 in a direction indicated by the first arrow 428 may trigger light signature determination. Movement of the physical object 424 in a direction indicated by the second arrow 426 may switch the positive weighting of light measurements from the left side of the display device 214 to positively weight light measurements from the right side of the display device 214. As depicted in FIG. 4, when a physical object is to the left of the display device 214, light incident on a left region of the face may be positively weighted while light incident on a right region of the face may be negatively weighted. Thus, not only is the light signature accounted for in setting the display settings, but a localized light signature at the exact location where the physical object is placed is emphasized.

Put another way, as described above and as depicted in FIG. 2, lighting conditions may be different even between different sides of a display device 214. In the example depicted in FIG. 2, this is on account of the ceiling light 216 that is on one side of the display device 214. In this example, when a physical object to be compared is placed on the same side of the display device 214 as the ceiling light 216, the light measurements from a region of the face closest the ceiling light 216 are positively weighted while those light measurements from a region of the face further away from the ceiling light 216 are negatively weighted.

Figure 5:
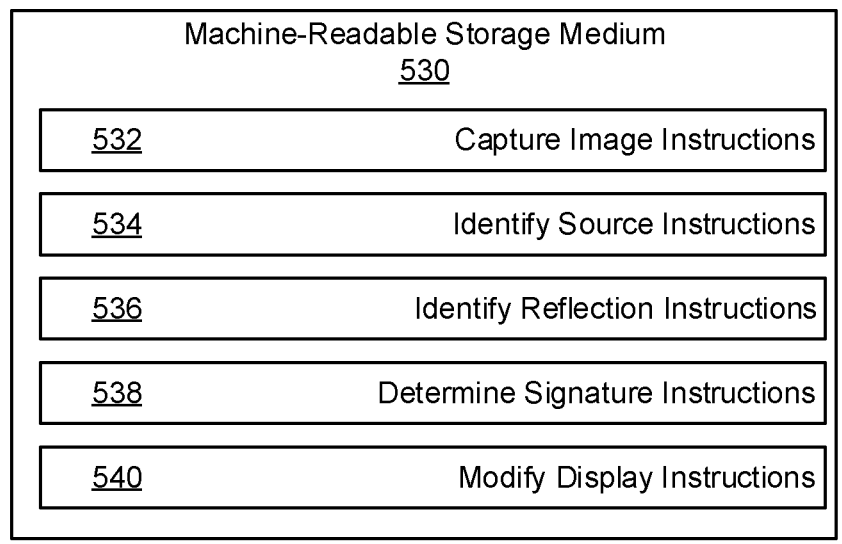
FIG. 5 depicts a non-transitory machine-readable storage medium for modifying display device settings based on a light signature, according to an example.

FIG. 5 depicts a non-transitory machine-readable storage medium 530 for modifying display device 214 settings based on a light signature, according to an example. As used in the present specification, the term "non-transitory" does not encompass transitory propagating signals.

To achieve its desired functionality, a computing device includes various hardware components. Specifically, a computing device includes a processor and a machine-readable storage medium 530. The machine-readable storage medium 530 is communicatively coupled to the processor. The machine-readable storage medium 530 includes a number of instructions 532, 534, 536, 538, 540 for performing a designated function. The machine-readable storage medium 530 causes the processor to execute the designated function of the instructions 532, 534, 536, 538, 540. The machine-readable storage medium 530 can store data, programs, instructions, or any other machine-readable data that can be utilized to operate the computing device. Machine-readable storage medium 530 can store computer readable instructions that the processor of the computing device can process, or execute. The machine-readable storage medium 530 can be an electronic, magnetic, optical, or other physical storage device that contains or stores executable instructions. Machine-readable storage medium 530 may be, for example, Random Access Memory (RAM), an Electrically Erasable Programmable Read-Only Memory (EEPROM), a storage device, an optical disc, etc. The machine-readable storage medium 530 may be a non-transitory machine-readable storage medium 530.

Capture image instructions 532, when executed by the processor, cause the processor to, capture an image of a face of a user 222 viewing a display device 214 as described above in connection with FIG. 1. Identify source instructions 534, when executed by the processor, cause the processor to identify a light source within the image as described above in connection with FIG. 1. Identify reflection instructions 536, when executed by the processor, cause the processor to, identify light from the display device 214 reflected off the face of the user 222 as described above in connection with FIG. 1. Determine signature instructions 538, when executed by the processor, cause the processor to determine the signature of the light in the image by positively weighting a light measurement from a light source and negatively weighting a light measurement for light emanating from the display device 214 and reflected off the face of the user 222. This may be performed as described above in connection with FIG. 1. Modify display instructions 540, when executed by the processor, cause the processor to modify a display device 214 setting based on the signature of light in the image as described above in connection with FIG. 1.

Figure 6:
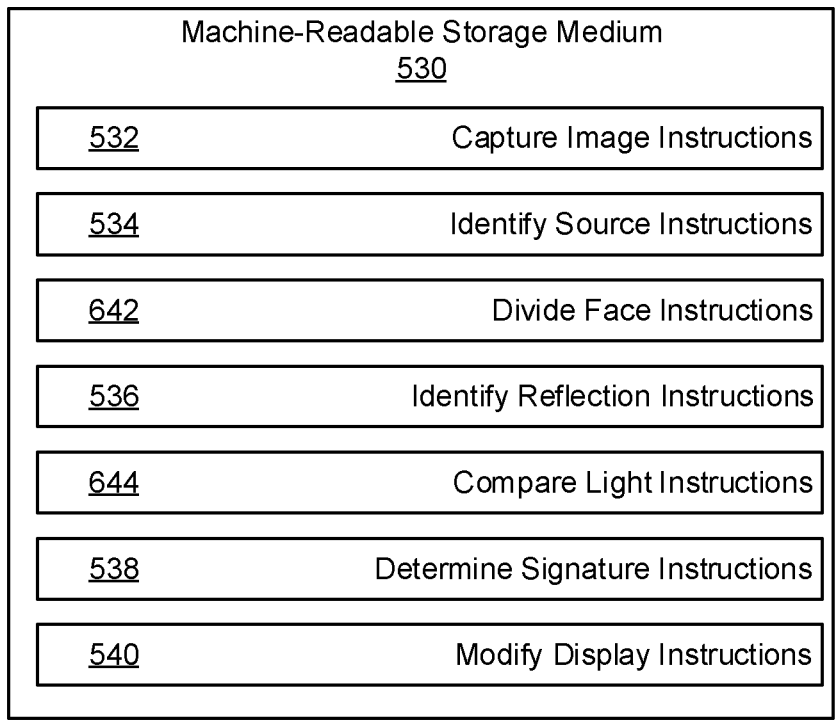
FIG. 6 depicts a non-transitory machine-readable storage medium for modifying display device settings based on a light signature, according to an example.

FIG. 6 depicts a non-transitory machine-readable storage medium 530 for modifying display device 214 settings based on a light signature, according to an example. Specifically, the non-transitory machine-readable storage medium 530 may include capture image instructions 532, identify source instructions 534, identify reflection instructions 536, and modify display instructions 540 similar to those described in connection with FIG. 5.

In this example, the non-transitory machine-readable storage medium 530 may include other instructions. For example, divide face instructions 642, when executed by the processor, may cause the processor to divide the face of the user 222 into regions as described above in connection with FIG. 1. Compare light instructions 644 when executed by the processor cause the processor to compare a light measurement from a first region to a light measurement in a second region to identify a direction of light reflecting off the face of the user 222 as described above in connection with FIG. 1.

Once the direction of light is determined, the determine signature instructions 538 may determine the signature of the light in the image by 1) positively weighting a light measurement from a light source in the image; 2) positively weighting a light measurement from a first zone (a non-front zone) of the image relative to the user; and 3) negatively weighting a light measurement from a second zone (a front zone) of the image relative to the user 222 as described above in connection with FIG. 1.

Figure 7:
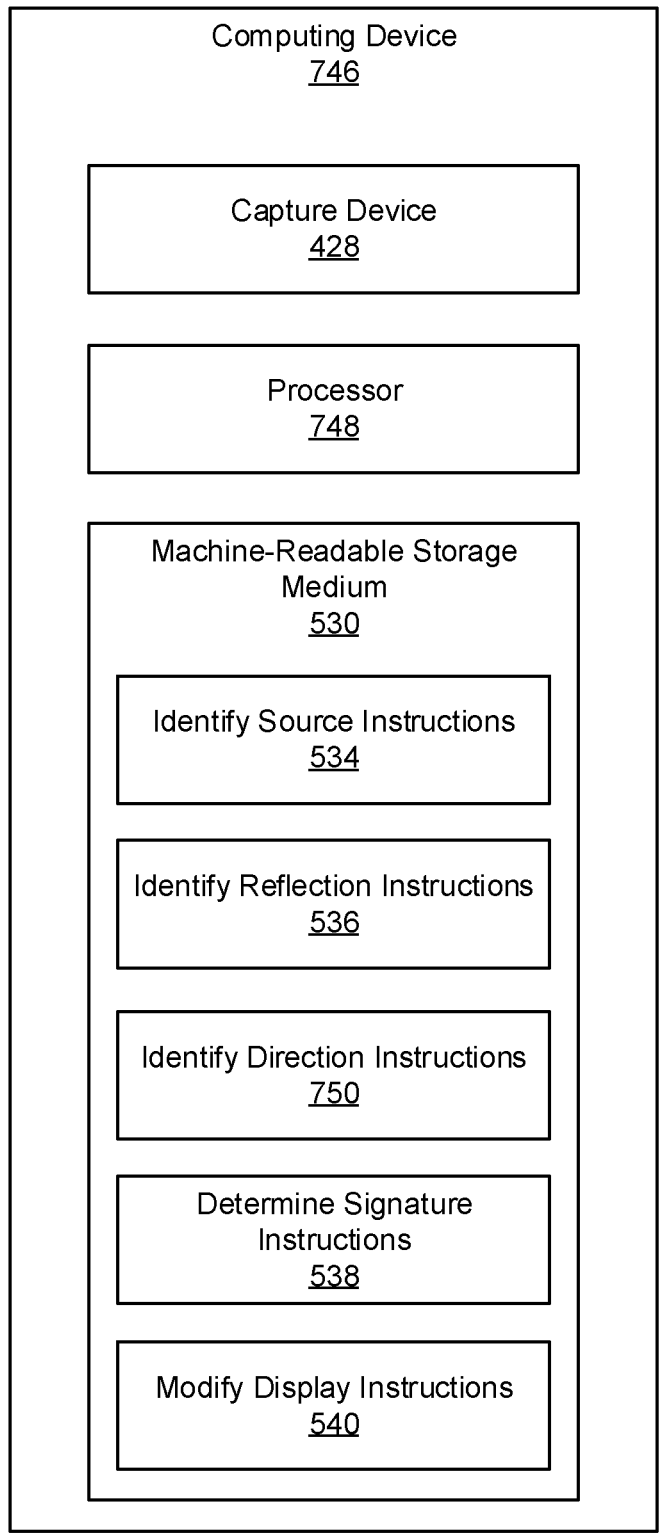
FIG. 7 depicts a computing device for modifying display device settings based on a light signature, according to an example.

FIG. 7 depicts a computing device 746 for modifying display device 214 settings based on a light signature, according to an example. The computing device 746 may be a desktop computer, laptop computer, all-in-one device, tablet, or gaming system to name a few. To execute its intended functionality, the computing device 746 includes various hardware components, which may include a processor 748 and non-transitory machine-readable storage medium 530. The processor 748 may include the hardware architecture to retrieve executable code from the non-transitory machine-readable storage medium 530 and execute the executable code. As specific examples, the computing device 746 as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The non-transitory machine-readable storage medium 530 stores computer usable program code for use by or in connection with an instruction execution system, apparatus, or device. The non-transitory machine-readable storage medium 530 may take many types of memory including volatile and non-volatile memory. For example, the memory may include Random Access Memory (RAM), Read Only Memory (ROM), optical memory disks, and magnetic disks, among others. The executable code may, when executed by the processor 748 cause the processor 748 to implement the functionality described herein.

The computing device 746 may include a capture device 748 to capture an image of a face of a user 222 viewing a display device 214. That is, the capture device 748 may be positioned so as to capture an image of the user's face as they are looking at the display device 214. The captured images or stream of captured images is passed to the processor 748 which executes instructions stored on the non-transitory machine-readable storage medium 530.

As described above, the processor 748 executes the identify source instructions 534 to identify a light source that is within the image or stream of images. The processor 748 may do so by performing object recognition. Specifically, the processor 748 may identify a shape, luminance, white point, brightness, contrast relative to other objects or combinations thereof to identify the object as a source light within the image.

The processor 748 may execute the identify reflection instructions 536 to identify light reflected off the face of the user 222. The processor 748 may execute identify direction instructions 750 to identify a direction of light reflecting off the face of the user 222. For example, as described above, the processor 748 may divide the face into quadrants or other regions and associate light measurements with each quadrant. Based on a comparison of light measurements on the different quadrants, the processor 748 may determine the direction of light reflecting off the face of the user 222. The processor 748 may also execute the determine signature instructions 538 and the modify display instructions 540 as described above in connection with FIG. 1.

What is claimed is:

1. A non-transitory machine-readable storage medium encoded with instructions executable by a processor of a computing device to, when executed by the processor, cause the processor to:
   capture an image of a face of a user viewing a display device;
   identify light from the display device reflected off the face of the user;
   identify a light source in the captured image, the light source different from the display device, wherein identifying the light source comprises performing object recognition of the light source in the captured image;
   determine a signature of the light in the captured image by:
      positively weighting a light measurement from the light source; and
      negatively weighting a light measurement emanating from the display device and reflected off the face of the user; and
   modify a display device setting based on the signature of the light in the captured image.

2. The non-transitory machine-readable storage medium of claim 1, further comprising instructions to cause the processor to determine whether a physical object is being compared to an object displayed on the display device.

3. The non-transitory machine-readable storage medium of claim 2, further comprising instructions to cause the processor to trigger determination of the signature of the light based on a determination that the physical object is being compared to the object displayed on the display device.

4. The non-transitory machine-readable storage medium of claim 2, further comprising instructions to cause the processor to trigger determination of the signature of the light based on a movement of the physical object relative to the display device.

5. The non-transitory machine-readable storage medium of claim 2, wherein the instructions to cause the processor to determine whether the physical object is being compared to the object displayed on the display device comprises:
   instructions to cause the processor to perform object recognition of the physical object and the object displayed on the display device;
   instructions to cause the processor to compare a color of the physical object with a color of the object displayed on the display device; or
   a combination thereof.

6. The non-transitory machine-readable storage medium of claim 2:
   further comprising instructions to cause the processor to determine a position of the physical object; and
   wherein the instructions to determine a signature of the light in the captured image positively weight a light measurement from a location that is adjacent the position of the physical object.

7. The non-transitory machine-readable storage medium of claim 1, further comprising instructions to cause the processor to determine an influence of light from the display device that is reflected off the face of the user by adjusting the display device setting and correlating a light measurement with the adjustment.

8. The non-transitory machine-readable storage medium of claim 1, wherein the signature comprises:
   a spectrum of the light in the captured image;
   a luminance of the light in the captured image;
   a red, green, and blue measurement of the light in the captured image;
   a wavelength of the light in the captured image;
   a frequency of the light in the captured image;
   an intensity of the light in the captured image;
   a white point of the light in the captured image; or
   a combination thereof.

9. The non-transitory machine-readable storage medium of claim 1, wherein the signature comprises a type of the light source.

10. The non-transitory machine-readable storage medium of claim 9, wherein the instructions to cause the processor to determine the signature of the light comprise instructions to cause the processor to compare a light measurement from the captured image to a database of light measurements of identified light types.

11. A computing device, comprising:
   a capture device to capture an image of a face of a user viewing a display device; and
   a processor to:
      identify a light source in the captured image, the light source different from the display device, wherein identifying the light source comprises performing object recognition of the light source in the captured image;
      identify light from the display device reflecting off the face of the user;
      identify a direction of light from the light source reflecting off the face of the user;
      determine a signature of the light in the captured image by:
         positively weighting a light measurement from the light source;
         positively weighting a light measurement behind or to a side of the user; and
         negatively weighting a light measurement in front of the user; and
      modify a display device setting based on the signature of the light.

12. The computing device of claim 11, wherein the processor is to identify a shape, a luminance, a white point, a brightness, a contrast relative to another object, or a combination thereof to identify the light source in the captured image.

13. The computing device of claim 11, wherein the processor is to label the direction of light as below, above, to the left, to the right, or a combination thereof to identify the direction of light reflecting off the face of the user.

14. The computing device of claim 11, wherein the processor is to identify a light gradient across the face of the user to identify the direction of light reflecting off the face of the user.

15. The computing device of claim 14, wherein a radial gradient from a center of the face indicates light reflected from the display device.

16. A non-transitory machine-readable storage medium encoded with instructions executable by a processor of a computing device to, when executed by the processor, cause the processor to:
   capture an image of a face of a user viewing a display device;
   identify a light source in the image;
   divide the face of the user into regions;
   identify light reflecting off the face of the user;
   compare a light measurement from a first region to a light measurement in a second region to identify a direction of light reflecting off the face of the user;
   determine a signature of the light in the image by:
      positively weighting a light measurement from the light source;
      positively weighting a light measurement from a first zone of the image relative to the user; and
      negatively weighting a light measurement from a second zone of the image relative to the user; and
   modify a display device setting based on the signature of the light.

17. The non-transitory machine-readable storage medium of claim 16:
   further comprising instructions to cause the processor to identify a white balance landmark feature on the face of the user; and
   wherein the instructions to determine the signature of the light in the image positively weight a light measurement from the white balance landmark feature.

18. The non-transitory machine-readable storage medium of claim 16, further comprising instructions executable by the processor of the computing device to:
   determine when light from the display device reflected off the face of the user is a dominant light source in the image; and
   notify the user of the dominant light source.

19. The non-transitory machine-readable storage medium of claim 16, wherein the display device setting comprises:
   a brightness of the display device;
   a contrast of the display device;
   a white point of the display device; or
   a combination thereof.

* * * * *